US009453912B2

(12) United States Patent
Kaida et al.

(10) Patent No.: US 9,453,912 B2
(45) Date of Patent: Sep. 27, 2016

(54) DEVICE AND METHOD FOR DISPLAYING SHIP PERIMETER INFORMATION

(71) Applicant: Furuno Electric Co., Ltd., Nishinomiya (JP)

(72) Inventors: Hidetoshi Kaida, Kobe (JP); Motoji Kondo, Ashiya (JP); Katsuyuki Yanagi, Kakogawa (JP); Masahiro Nakahama, Sanda (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 420 days.

(21) Appl. No.: 13/864,083

(22) Filed: Apr. 16, 2013

(65) Prior Publication Data

US 2013/0271309 A1    Oct. 17, 2013

(30) Foreign Application Priority Data

Apr. 17, 2012 (JP) ................................. 2012-093847

(51) Int. Cl.
| | |
|---|---|
| *G01S 13/93* | (2006.01) |
| *G01S 7/10* | (2006.01) |
| *G01S 7/12* | (2006.01) |
| *G01S 7/24* | (2006.01) |
| *G01S 13/42* | (2006.01) |

(52) U.S. Cl.
CPC .............. *G01S 13/9307* (2013.01); *G01S 7/10* (2013.01); *G01S 7/12* (2013.01); *G01S 7/24* (2013.01); *G01S 13/42* (2013.01)

(58) Field of Classification Search
CPC ................................................... G01S 13/9307
USPC .............................................................. 342/41
See application file for complete search history.

(56) References Cited

U.S. PATENT DOCUMENTS

| | | | | |
|---|---|---|---|---|
| 7,089,094 | B2 * | 8/2006 | Yanagi | ...................... G01S 7/22 |
| | | | | 701/21 |
| 7,817,079 | B1 * | 10/2010 | Funk | ...................... G01S 7/003 |
| | | | | 342/41 |
| 7,830,275 | B2 * | 11/2010 | Hiraoka | ................... B63B 49/00 |
| | | | | 340/984 |
| 2008/0086267 | A1 * | 4/2008 | Stolte | .................. H04B 7/18513 |
| | | | | 701/300 |

FOREIGN PATENT DOCUMENTS

| | | |
|---|---|---|
| CN | 101344993 A | 1/2009 |
| CN | 201527714 U | 7/2010 |
| CN | 102190074 A | 9/2011 |
| CN | 202018507 U | 10/2011 |
| JP | S62201382 A | 9/1987 |

(Continued)

*Primary Examiner* — Matthew M Barker
(74) *Attorney, Agent, or Firm* — Alleman Hall McCoy Russell & Tuttle LLP (57) ABSTRACT

A ship perimeter information display device is provided. The device includes a sensor information input unit connected with a sensor equipped in a first ship and for receiving an input of a detection result of the sensor, an AIS information input unit for receiving an input of VDO information that is a VHF data link own-ship message contained in AIS information transmitted from the first ship to a second ship, a display unit for displaying a situational image illustrating a situation around the first ship, and a control unit for displaying, on the display unit, information indicating a difference between first state information of the first ship obtained based on the detection result of the sensor and second state information of the first ship obtained based on the VDO information.

15 Claims, 5 Drawing Sheets

(56) References Cited

FOREIGN PATENT DOCUMENTS

| | | |
|---|---|---|
| JP | H08338867 A | 12/1998 |
| JP | 2000195000 A | 7/2000 |
| JP | 2005141656 A | 6/2005 |
| JP | 2005181078 A * | 7/2005 |
| JP | 2005182539 A * | 7/2005 |
| JP | 2008009846 A | 1/2008 |
| JP | 2011175512 A | 9/2011 |
| KR | 101124267 B | 3/2012 |

* cited by examiner

DEVICE AND METHOD FOR DISPLAYING SHIP PERIMETER INFORMATION

CROSS-REFERENCE TO RELATED APPLICATION(S)

The application claims priority under 35 U.S.C. §119 to Japanese Patent Application No. 2012-093847, which was filed on Apr. 17, 2012, the entire disclosure of which is hereby incorporated by reference.

TECHNICAL FIELD

The present invention generally relates to a ship perimeter information display device that is suitable to be equipped in a ship that can transmit AIS information.

BACKGROUND OF THE INVENTION

AIS (Universal Shipborne Automatic Identification System) is a system constructed to easily grasp existence of one or more perimeter ships around a ship concerned and traveling statuses thereof.

Conventionally, ships that satisfy a predetermined condition are required to equip a device that can transmit AIS information (AIS transceiver) thereon. The device wirelessly transmits, to the perimeter of the ship concerned, positional information and traveling information of the ship concerned (hereinafter, may simply be referred to as "the ship") at a predetermined cycle according to the traveling state of the ship (e.g., moored or moving), by using a frequency within a VHF band. The AIS information is received by the one or more perimeter ships or a land station, and thereby, information on the ship can be acquired (e.g., ship position and speed).

Meanwhile, JP2005-141656A discloses such an AIS transceiver, and points out the possibility that information which is different from the face may be transmitted to a receiver side intentionally. In JP2005-141656A, in order to solve this problem, the application of an authentic method using a public key cryptosystem as a transmitter securing means which is mathematically difficult to alter is proposed to prevent misconduct of an operator of the ship, such as faking the AIS information.

However, in an actual situation of ship operation, other than such an intentional misconduct by the operator, even when there is no such intention, there have been cases where the AIS information including wrong contents is transmitted due to, for example, defects of the sensors or a misinput of information by the operator. Such unintentional mistake cannot be solved even by the method in JP2005-141656A, and for smooth ship travel, a means for easily confirming information to be transmitted to other ships on the ship side has been desired.

SUMMARY OF THE INVENTION

The present invention is made in view of the above situation, and it provides a ship perimeter information display device that can prevent AIS information of a ship concerned that is different from the fact, from being transmitted to the perimeter without the intention of a ship operator.

According to an aspect of the invention, a ship perimeter information display device having the following configuration is provided. The device includes a sensor information input unit, an AIS information input unit, a display unit, and a control unit. The sensor information input unit is connected with a sensor equipped in a first ship and for receiving an input of a detection result of the sensor. The AIS information input unit receives an input of VDO information which is a VHF data link own-ship message contained in AIS information transmitted from the first ship to second ships. The display unit displays a situational image illustrating a situation around the first ship. The control unit displays, on the display unit, information indicating a difference between first state information of the first ship obtained based on the detection result of the sensor and second state information of the first ship obtained based on the VDO information.

In this manner, the operator can easily confirm whether the first ship state to be transmitted to the second ship in the perimeter as AIS information is correct by checking the difference indicating information displayed on the display unit. Thus, a chance for the operator to notice and solve, for example, incorrect settings relating to the AIS, may be increased. As a result, it can prevent misinforming the second ships. Thus, smooth navigation can be achieved.

The control unit may graphically display, on the display unit, a comparison result about a position or azimuth of the first ship as the difference indicating information.

In this manner, the operator can instinctively determine whether the position/azimuth of the first ship to be transmitted to the second ship as the AIS information is correct, by the graphical display on the display unit.

The AIS information input unit may receive an input of VDM information that is a VHF data link message of a second ship contained in AIS information transmitted from the second ship to the first ship. The control unit may display state information of the second ship obtained from the VDM information of the second ship, on the display unit in addition to the difference indicating information.

In this manner, the operator may check the state of the second ship based on the AIS information received from the second ship, on the display unit in addition to the difference indicating information. Since formats of the VDO information and the VDM information have many points in common, a major part of analyzing processing of the VDM information can be used as it is for the VDO information to contribute in simplifying the configuration.

The control unit may display the difference indicating information on the display unit when the first state information of the first ship has over a predetermined amount of difference from the second state information of the first ship.

In this manner, since the difference indicating information is not displayed on the display unit when the two kinds of state information of the first ship finely match with each other, an excessively annoying display on the display unit may be prevented.

The difference indicating information may include a warning display.

In this manner, the operator can surely be alerted about the abnormal state of the first ship to be transmitted to the second ship as the AIS information.

The control unit may output a signal to automatically revise the setting of an AIS transceiver serving as an output source of the VDO information, when the first state information of the first ship has over a predetermined amount of difference from the second state information of the first ship.

In this manner, by revising the setting of the AIS transceiver, the abnormality of the AIS information to be transmitted to the second ship can be automatically resolved. As a result, fine workability can be achieved.

The display unit graphically displays a graphical symbol indicating a length and width of the first ship obtained from the VDO information, in a scale corresponding to the situational image to serve as the ship state information.

In this manner, the operator can instinctively determine whether the length and width of the ship to be transmitted to the second ship as the AIS information is correct, by the graphical symbol display in the situational image displayed on the display unit.

According to another aspect of the invention, a method of displaying ship perimeter information is provided. The method includes inputting VDO information that is a VHF data link own-ship message contained in AIS information transmitted from a first ship to a second ship. The method also includes displaying, a situational image illustrating a situation around the first ship as the first state information of the first ship, as well as graphically displaying state information of the first ship obtained based on the VDO information by superimposing onto the situational image, as the second state information of the first ship.

In this manner, the state of the first ship corresponding to the VDO information to be transmitted to the second ship in the periphery as the AIS information is graphically displayed on the display unit. Therefore, the operator can instinctively determine whether the AIS information to be transmitted to the second ship in the periphery is normal, by looking at the display showing the state of the first ship.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
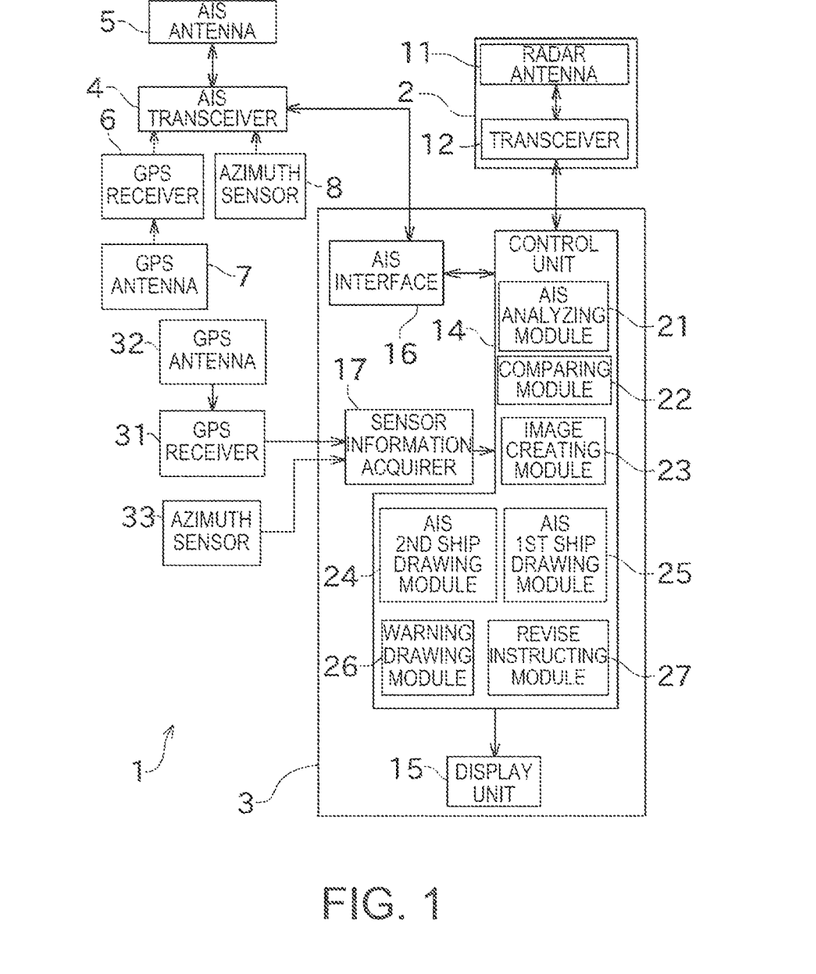
FIG. 1 is a functional block diagram showing an overall configuration of a radar apparatus provided with a radar indicator according to one embodiment of the invention.
Figure 2:
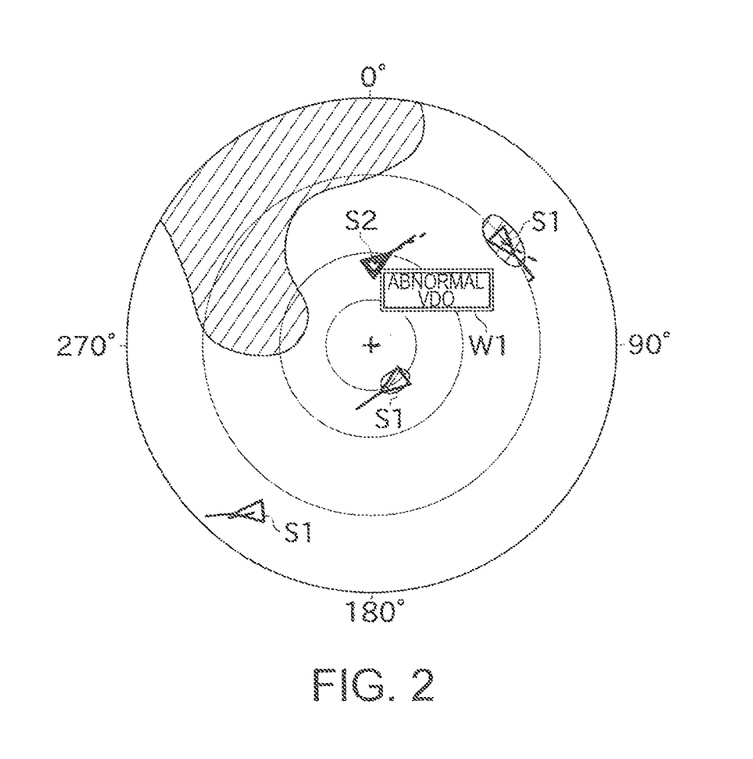
FIG. 2 is a view showing one example of a display screen on a display unit.
Figure 3:
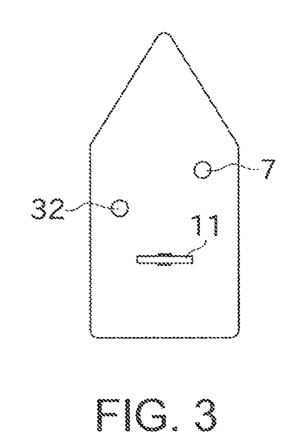
FIG. 3 is a schematic plan view showing a positional relation between a radar antenna and GPS antennas.

Next, embodiments of the present invention are described with reference to the accompanying drawings. FIG. 1 is a functional block diagram showing an overall configuration of a radar apparatus 1 provided with a radar indicator 3 according to one embodiment of the invention. FIG. 2 is a view showing one example of a display screen on a display unit 15. FIG. 3 is a schematic plan view showing a positional relation between a radar antenna 11 and GPS antennas 7 and 32.

As shown in FIG. 1, the radar apparatus 1 of this embodiment includes a radar antenna unit 2 and a radar indicator 3 (navigation information display device, ship perimeter information display device) and is installed on a ship (hereinafter, may simply be referred to as "the first ship" or "the ship"). The radar indicator 3 is connected with an AIS transceiver 4, a GPS receiver 31 (sensor), and an azimuth sensor 33 (sensor) which are also installed on the first ship. The GPS receiver 31 is electrically connected with a GPS antenna 32.

The radar antenna unit 2 includes a radar antenna 11 and a transceiver 12. The radar antenna 11 transmits microwaves based on an instruction of the transceiver 12 while revolving, and receives one or more reflection waves from one or more target objects. The transceiver 12 samples (digitalizes) the one or more signals received by the radar antenna 11 (radar echo), and outputs the digitalized radar echo to the radar indicator 3.

The radar indicator 3 includes a control unit 14, a display unit 15, an AIS interface 16 (AIS information input unit), and a sensor information acquirer 17 (sensor information input unit).

The control unit 14 generates predetermined images including a radar image (situational image) showing a situation around the first ship, based on various data obtained from the radar antenna unit 2, the AIS transceiver 4, the GPS receiver 31, and the azimuth sensor 33, and outputs the created images to the display unit 15. Specific examples of the azimuth sensor 33 include a gyrocompass. Further, the control unit 14 is configured to control the radar antenna unit 2 and the AIS transceiver 4 when needed. Note that, the detailed configuration of the control unit 14 is described later.

The AIS transceiver 4 is connected with the AIS antenna 5, and receives AIS signals transmitted from other ships (hereinafter, may simply be referred to as "the second ship"). Various kinds of AIS signals can be received, including a so-called VDM sentence. Note that, the "VDM" is an abbreviation of VHF Data-link Message. The VDM sentence contains information on the second ship, such as a current position, a course over ground, a ground velocity, a heading, a rudder angular velocity, and a traveling state of the second ship.

Moreover, the AIS transceiver 4 is connected with the GPS receiver 6 and the azimuth sensor 8 which acquire data of a position and the heading of the first ship (ship position and ship heading) to be transmitted to the perimeter as the AIS information. The GPS receiver 6 is connected with the GPS antenna 7. Thus, the AIS transceiver 4 transmits, for example, information obtained from the GPS receiver 6 or the azimuth sensor 8, to second ships as an AIS signal, at a predetermined cycle. The AIS signal is referred to as a VDO sentence, and contains information on the first ship, such as a current position, a course over ground, a ground velocity, a heading, a rudder angular velocity, and a navigation state of the first ship. Note that, the "VDO" is an abbreviation of a VHF data link own-ship message.

The AIS information acquired by the AIS transceiver 4 is outputted to the control unit 14 via the AIS interface 16 provided to the radar indicator 3. The AIS interface 16 is configured as an external interface (e.g., connector) for loading the AIS information outputted from the AIS transceiver 4 into the radar indicator 3, and transmitting an instruction from the radar indicator 3 to the AIS transceiver 4.

The GPS receiver 6 receives GPS signals from GPS satellites and acquires information relating to the position (terrestrial reference absolute position) of the first ship. The GPS information acquired by the GPS receiver 6 is outputted to the AIS transceiver 4.

The azimuth sensor 8 acquires the heading (terrestrial reference absolute direction) of the first ship. Similar to the azimuth sensor 33, specific examples of the azimuth sensor 8 include a gyrocompass. The information of the heading of the first ship acquired by the azimuth sensor 8 is outputted to the AIS transceiver 4.

Note that, for example, data of an MMSI number and an IMO ship identification number which are numbers for identifying a ship (broadcast station), and body length, width, and type of the first ship can be stored in a memory (not illustrated) provided to the AIS transceiver 4. Since the data will basically not be changed once it is set in an initial operation of the AIS transceiver 4, the data is referred to as static information in the AIS.

Meanwhile, the AIS transceiver 4 acquires time (e.g., UTC), the position, course over ground, and ground velocity of the first ship by calculation using the GPS information acquired by the GPS transceiver 6. Moreover, the AIS transceiver 4 acquires the heading and rudder angular velocity by calculation using the azimuth information acquired by the azimuth sensor 8. Note that, since the data changes every moment according to the situation, it is referred to as dynamic information in the AIS.

The AIS transceiver 4 creates the VDO sentence to contain the static information and the dynamic information obtained as described above as needed, and transmits the AIS information containing the VDO sentence from the AIS antenna 5 to the perimeter as the AIS signal. Additionally, the AIS transceiver 4 outputs the VDO sentence transmitted from the AIS antenna 5 also to the control unit 14 via the AIS interface 16 simultaneously.

On the other hand, the AIS transceiver 4 outputs the AIS signals obtained from the second ships (e.g., VDM sentences described above) to the control unit 14 via the AIS interface 16.

The sensor information acquirer 17 provided to the radar indicator 3 is connected with the GPS receiver 31 and the azimuth sensor 33. The GPS receiver 31 is connected with the GPS antenna 32. The information acquired by the GPS receiver 31 and the azimuth sensor 33 (terrestrial reference ship position and heading of the first ship) is used as a reference of position and azimuth for the control unit 14 to create the image to be displayed on the display unit 15.

The control unit 14 includes an AIS analyzing module 21, a comparing module 22, an image creating module 23, an AIS second ship drawing module 24, an AIS first drawing module 25, a warning drawing module 26, and a revise instructing module 27.

The AIS analyzing module 21 analyzes the VDO sentence of the first ship or the VDM sentences from the second ships acquired through the AIS interface 16, and acquires positions and courses over ground of the first ship and second ships, etc. Note that, since the VDO and VDM sentences have almost common formats in the AIS specification, a major part of the configuration for analyzing the VDM sentence can be used to analyze the VDO sentence.

The comparing module 22 compares the information on the first ship (e.g., position and heading) obtained from the GPS receiver 31 and the azimuth sensor 33 (first state information of the first ship) to the information on the first ship (e.g., position and heading) obtained by analyzing the VDO sentence of the first ship using the AIS analyzing module 21 (second state information of the first ship), so as to determine whether the difference between the information is above a predetermined threshold (whether an abnormality exists in the contents of the VDO sentence outputted to the perimeter by the AIS transceiver 4 of the first ship). Note that, hereinafter, a state where the abnormality is determined to exist in the contents of the VDO sentence by the comparing module 22 may simply be referred to as "the VDO abnormal state."

The image creating module 23 creates the radar image for around the first ship based on the one or more radar echoes obtained from the transceiver 12 of the radar antenna unit 2. Note that, the radar image of this embodiment is created such that the first ship is positioned in the center and the heading of the first ship is oriented upward (so called "heading up"). The information of the heading of the first ship detected by the azimuth sensor 33 is used for the creation of the radar image.

The AIS second ship drawing module 24 draws AIS symbols (state information) of the second ships by superimposing onto the radar image, based on the information obtained by analyzing, with the AIS analyzing module 21, the VDM sentences received by the AIS transceiver 4 from the second ships.

Here, although the positions of the second ships obtained from the VDM sentences are terrestrial reference positions, the radar image created by the image creating module 23 is a relative image with reference to the position and heading of the first ship (hereinafter, may be simply referred to as "the first ship position" and "the first ship heading"). Therefore, in drawing a ship symbol of the second ship on the radar image by the AIS second ship drawing module 24, it is drawn upon acquiring the information outputted from the GPS receiver 31 and the azimuth sensor 33 as the terrestrial reference position and heading of the first ship and calculating each relative position and azimuth of the second ship with respect to the first ship.

The AIS first ship drawing module 25 draws an AIS symbol of the first ship by superimposing onto the radar image, based on the information obtained by analyzing, with the AIS analyzing module 21, the VDO sentence of the first ship outputted from the AIS transceiver 4.

Specifically, when drawing the first ship on the heading-up radar image, the first ship is normally oriented upwardly in the center of the image. However, for example, when a geographical coordinate system set in the GPS receiver 6 is incorrect and/or the azimuth sensor 8 malfunctions, the first ship will be drawn at an abnormal position and in an abnormal orientation. By using this, in this embodiment, the state of the first ship obtained by analyzing the VDO sentence is graphically drawn as the AIS symbol so that an operator can visually and instinctively understand the contents of the VDO sentence of the first ship, and when an abnormality exists, the operator can swiftly notice and solve the abnormality. Therefore, it can be said that the AIS symbol is the information of the state of the first ship obtained from the VDO sentence (state information of the first ship).

Note that, the AIS symbol of the first ship displayed herein (hereinafter, may be referred to as "the first ship symbol") is displayed to be more distant from the original position (the center of the radar image) as the difference between the first ship position acquired by the GPS receiver 31 and the first ship position obtained from the VDO sentence is larger. Additionally, the orientation of the first ship symbol is displayed to tilt larger from the original orientation (upright) as the difference between the first ship heading acquired by the azimuth sensor 33 and the first ship heading obtained from the VDO sentence is larger. In this regard, it can be said that the first ship symbol is the information obtained by comparing the contents of the VDO sentence to the first ship position and ship heading obtained from the GPS receiver 31 and the azimuth sensor 33 (difference indicating information).

Note that, while the abnormality described above does not exist, the first ship symbol maintains orienting upward at the central position of the radar image. Therefore, the operator may feel annoyed to see the first ship symbol displayed on the radar image constantly. Thus, in this embodiment, the AIS first ship drawing module 25 draws the first ship symbol only when it is determined to have, as a result of the comparison by the comparing module 22, an incorrect content in the VDO sentence which is outputted from the first ship side (only in the VDO abnormal state). In this manner, an excessively crowded display on the display unit 15 can be prevented, and comfortable operation can be provided.

When the comparing module 22 determines the VDO abnormal state, the warning drawing module 26 displays the warning for the state by superimposing onto the radar image. In this manner, by further alerting the operator, the operator can surely be stimulated to cope with the warning, for example, by revising the setting. Note that, the warning display can be considered as one kind of the difference indicating information described above.

When the comparing module 22 determines the VDO abnormal state, the revise instructing module 27 transmits an instruction to the AIS transceiver 4 side to change the setting on the AIS transceiver 4 side if possible, so that the abnormality is resolved.

The display unit 15 is configured as a liquid crystal display where a color display is available. The display unit 15 displays, on the radar created by the image creating module 23, the AIS symbols drawn by the AIS second ship drawing module 24 and the AIS first ship drawing module 25, and the warning drawn by the warning drawing module 26, in a superimposed manner.

FIG. 2 is a view showing one example of the second ship symbols S1 (state information of the second ship) drawn by the AIS second ship drawing module 24 and a ship symbol S2 (difference indicating information) drawn by the AIS first ship drawing module 25 on the heading-up radar image displayed on the display unit 15. Each of the second ship symbols S1 is drawn by combining a triangle having a solid straight line extending from its tip, with a dotted straight line. The orientation of the tip of the triangle (orientation of the solid straight line) indicates the heading of the second ship, and the dotted straight line indicates a course and a velocity (ground velocity vector) of the second ship.

Same as the second ship symbol S1, the first ship symbol S2 is drawn by a triangle, a solid straight line, and a dotted straight line. Also, the first ship symbol S2 is desired to be drawn such that it can be differentiated from the second ship symbol S1, for example, for the first ship symbol S2, by changing the display color, the line thickness, and/or blinking.

The operator can accurately grasp the difference between the state of the first ship to be transmitted to the second ship in the perimeter as the VDO sentence and the actual state of the first ship by comparing the position and orientation of the first ship symbol S2 to the position and orientation of the first ship that originally should be displayed. With reference to the example in FIG. 2, since the first ship symbol S2 is not drawn at the position and orientation where the first ship symbol S2 should originally be (i.e., not drawn upward at the central position of the radar image), the operator can instantly grasp that the contents of the VDO sentence is not normal. Additionally, since a warning display W1 is also drawn on the display screen, the operator can notice the abnormality more easily.

When the VDO abnormality is detected by the comparing module 22 as described above, the revise instructing module 27 refers to the setting contents of the AIS transceiver 4. As a result of this reference, for example, when an incorrect setting is found in the geographical coordinate system which the GPS receiver 6 outputs, the revise instructing module 27 transmits an instruction signal for correctly revising the setting of the geographical coordinate system, to the AIS transceiver 4 via the AIS interface 16. The AIS transceiver 4, upon receiving the instruction signal, correctly revises the setting of the GPS receiver 6. Thus, a correct VDO sentence is outputted thereafter. As described above, with the radar indicator 3 of this embodiment, since the revise instructing module 27 can automatically perform the revise of the setting, a significant improvement in convenience in use is achieved.

Note that, not limited to the revise of the incorrect geographical coordinate system described above, for example, the installation position of the GPS antenna 7 on the first ship can also automatically be revised by the instruction of the revise instructing module 27. Specifically, the radar antenna 11 and the two GPS antennas 7 and 32 are extremely difficult to be installed collectively due to the physical restriction, and as shown in the example in FIG. 3, the layout where the antennas are separated to some extent is adopted in many cases. In this regard, the radar apparatus 1 of this embodiment is configured such that the positions of the radar antenna 11 and the GPS antenna 32 can be set in the radar indicator 3 as offset values, and the position of the GPS antenna 7 can be set in the AIS transceiver 4 as an offset value. Thus, the second ship symbol S1 and the first ship symbol S2 can be superimposed onto each other on the radar image at an appropriate position while considering a positional offset among the antennas by a suitable calculation based on the setting contents. However, when an error exists in the position (offset value) of the GPS antenna 7 which is set in the AIS transceiver 4, the first ship symbol S2 is drawn to be shifted from the center of the radar image by the amount corresponding to the error, causing the VDO abnormal state. Here, the revise instructing module 27 transmits the instruction to the AIS transceiver 4, and the AIS transceiver 4 revises the setting of the offset value so as to compensate the error. Thus, the VDO abnormal state can be resolved. Additionally, the revise instructing module 27 can transmit an instruction to the AIS transceiver 4 to suitably correct the heading detected by the azimuth sensor 8 so as to match with the heading detected by the azimuth sensor 33.

As described above, the radar indicator 3 of the radar apparatus 1 of this embodiment includes the sensor information acquiring module 17, the AIS interface 16, the display unit 15, and the control unit 14. The sensor information acquiring module 17 is connected with the GPS transceiver 31 and the azimuth sensor 33 equipped in the first ship, and receives an input of detection results of the GPS receiver 31 and the azimuth sensor 33. The AIS interface 16 can receive the input of the VDO sentence which is the VHF data-link own-ship message included in the AIS information. The display unit 15 displays the radar image indicating the situation around the first ship. The control unit 14 can display, on the display unit 15, the first ship symbol S2 obtained by comparing the first state information of the first ship obtained from the detection results of the GPS transceiver 31 and the azimuth sensor 33, to the second state information of the first ship obtained from the VDO sentence.

In this manner, the abnormality of the AIS information to be transmitted to the second ships can easily be noticed by the operator viewing the first ship symbol S2 displayed on the display unit 15. As a result, the AIS information of the first ship which is different from the fact can be prevented from being transmitted to the perimeter and misinforming the second ships. Thus, smooth navigation can be achieved.

Figure 4:
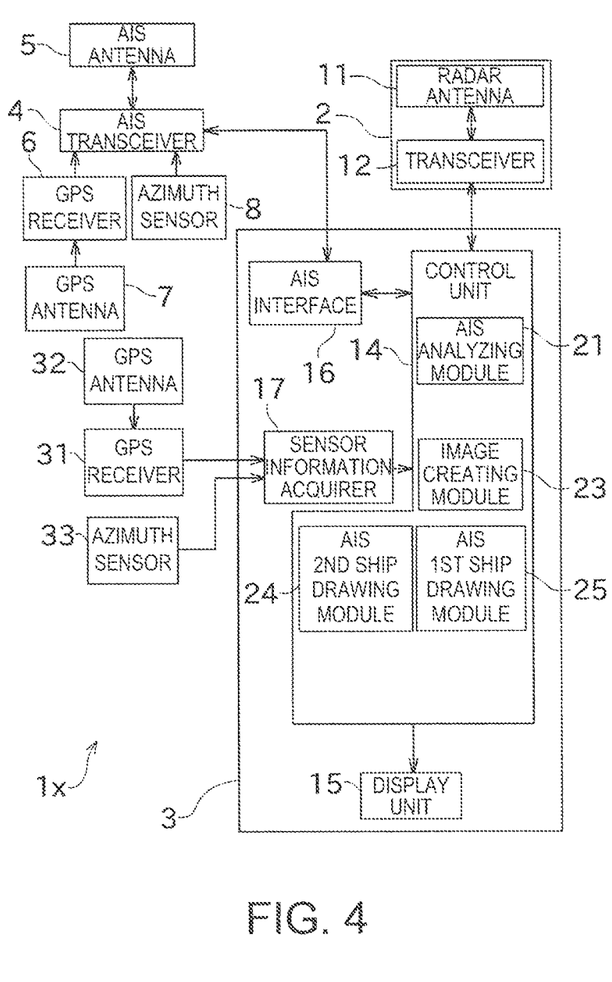
FIG. 4 is a functional block diagram showing a radar apparatus of a modification.
Figure 5:
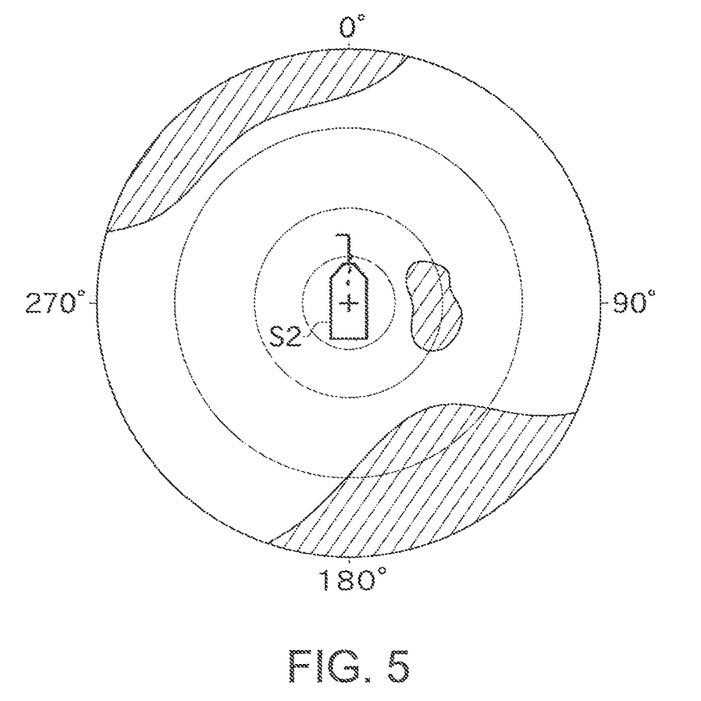
FIG. 5 is a view showing a display example of a first ship symbol in a real scale mode.

Next, a modification of the above embodiment is described. FIG. 4 is a functional block diagram showing a radar apparatus 1x of this modification. FIG. 5 is a view showing one example of displaying the first ship symbol S2 in a real scale mode. Note that, in describing this modification, the same reference numerals are applied in FIGS. 4 and 5 for the members same as or similar to the above embodiment, and the description thereof may be omitted.

In the radar apparatus 1x according to the modification illustrated in FIG. 4, the comparator 22, the warning drawing module 26, and the revise instructing module 27 are omitted from the control unit 14 of the radar indicator 3, compared to the configuration in FIG. 1. In this modification, the radar indicator 3 displays the first ship symbol S2 by superimposing onto the radar image constantly, based on the information acquired from the VDO sentence.

In this modification, the first ship symbol S2 corresponding to the VDO sentence is displayed on the display unit 15 at any time. Specifically, it is not determined on the apparatus side, whether the contents of the VDO sentence have abnormality, and the determination of the abnormality relies on the operator who actually views the display unit 15. Therefore, the warning display W1 drawn in the above embodiment is omitted, and the automatic revising instruction by the revise instructing module 27 is not performed.

Note that, the radar indicator 3 of this modification has a mode for displaying the first ship symbol S2 in a specific form. In this mode (real scale mode), the radar image is displayed in a suitable scale so that the details of the radar echo can easily be grasped, and as shown in FIG. 5, the first ship symbol S2 is a graphical symbol formed in a shape of the first ship having the same ratio in length and width as that contained in the VDO sentence, in a scale corresponding to the radar image. In this manner, the operator can instinctively confirm whether the value in length and width of the first ship which is set into the AIS transceiver 4 is correct based on a relative relation between the drawn shape of the first ship symbol S2 and the size of the radar echo(s) of the an island in the perimeter, etc.

As described above, the radar indicator 3 of the radar apparatus 1x of this modification includes the AIS interface 16 and the display unit 15. The AIS interface 16 receives an input of VDO information which is the VHF data-link own-ship message included in the AIS information. The display unit 15 displays the radar image showing the situation around the first ship, as well as it graphically displays the first ship symbol S2 indicating the state of the first ship obtained from the VDO information by superimposing onto the radar image.

In this manner, the abnormality of the AIS information to be transmitted to the perimeter can easily be noticed by the operator viewing the first ship symbol S2 displayed on the display unit 15. As a result, the AIS information of the first ship which is different from the fact can be prevented from being transmitted to the perimeter and misinforming the second ship, etc. Thus, a safe navigation can be realized.

As above, the suitable embodiment and the modifications of the present invention are described. The above configurations may be modified as follows.

The display unit 15 may be configured to additionally display (graphically, if needed) information other than the position, course over ground, velocity, heading, and rudder angular velocity of the first ship, etc. For example, since it has been known that information on a destination of the first ship may be included in the AIS information, the display unit 15 may be configured such that this destination is displayed on the radar image by a letter string. Alternatively, information on the navigation state of the first ship, a cargo in the first ship and the like included in the AIS information may be displayed on the radar image by letter strings, icons, etc. According to this configuration, it becomes easier for the operator to notice if the AIS information that needs to be updated frequently is still in the old version and has not been updated, such as, the destination and the navigation state of the first ship. Moreover, the display unit 15 may be configured to display, upon accumulating the first ship position information acquired from the VDO sentence, the track of the first ship for a previous predetermined period of time. When the VDO abnormal state occurs, the track can effectively be used for identifying the cause of the abnormality.

The radar indicator 3 may be provided with a mode switch (e.g., button or menu display screen) to be able to switch the mode for displaying the first ship symbol S2, among the mode for constantly displaying as described in the modification in FIG. 4, the mode for displaying only in the VDO abnormal state, and the mode for not displaying it at all.

Between the radar apparatuses 1 and 1x, the components provided respectively may be used commonly, such as the GPS receiver 6 with the GPS receiver 31, the azimuth sensor 8 with the azimuth sensor 3, and the GPS antenna 7 with the GPS antenna 32.

For the second ship symbol S1 and the first ship symbol S2, displaying forms other than the displaying form shown in FIG. 2 may be adopted alternatively. For example, the ground velocity vector can be displayed by an arrow instead of simple dotted-line.

Moreover, for the first ship symbol S2, the displaying form may be changed to, for example, only display the first ship position by being formed into a simple circular shape, or only display the first ship heading by being formed into a simple arrow extending from the center of the radar image.

When the comparator 22 determines that the VDO abnormality exists, the display form of the first ship symbol S2 may be changed so that it is not to be displayed, and only the warning display W1 is displayed as the difference indicating information. Moreover, the warning display W1 may be displayed by an icon instead of the letter string as in FIG. 2.

The orientation of the radar image displayed on the display unit 15 may be "north up" instead of "heading up." In this case, the positions and orientations for the second ship symbol S1 and the first ship symbol S2 to be drawn are changed accordingly.

The real scale mode in the modification shown in FIG. 5 can be applied to the configuration of the embodiment described with reference to FIG. 1.

Not limited to displaying the information of the first ship on the radar display screen, a dedicated display screen for allowing the operator to check whether the first ship state to be transmitted is correct may be provided.

The present invention can be applied without any problem even when a target tracking function is installed in the radar apparatus 1. Moreover, the configuration of the present invention is not limited for the radar apparatus, and for example, it can be applied to an electronic nautical chart display system (ECDIS) for displaying a nautical chart as situational information.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A ship perimeter information display device, comprising:
    a sensor information input unit connected with a sensor that is equipped in a first ship, configured to receive an input of a detection result of the sensor;
    an Automatic Identification System (AIS) information input unit configured to receive an input of VHF data link own-ship message (VDO) information contained in an AIS signal transmitted from the first ship to a second ship, the message being of the first ship;
    a display unit; and
    a control unit configured to cause the display unit to display a situational image illustrating a situation around the first ship and information indicating a difference between first state information of the first ship obtained based on the detection result of the sensor and second state information of the first ship obtained based on the VDO information as a difference indicating information;
    wherein the control unit is configured to output a signal to automatically revise a setting of an AIS transceiver serving as an output source of the VDO information, when the first state information of the first ship has over a predetermined amount of difference from the second state information of the first ship.

2. The device of claim 1, wherein the difference indicating information includes a difference in position or heading of the first ship, and is displayed graphically.

3. The device of claim 1, wherein the sensor includes an azimuth sensor,
    wherein the situational image is displayed based on azimuth information detected by the azimuth sensor, and
    wherein the control unit is configured to cause the display unit to graphically display at least one of position and heading of the first ship obtained from the VDO information as the difference indicating information.

4. The device of claim 1, wherein the AIS information input unit is configured to receive an input of VHF data link message (VDM) information of a second ship contained in an AIS signal transmitted from the second ship to the first ship, and
    wherein the control unit is configured to cause the display unit to display state information of the second ship obtained from the VDM information of the second ship, in addition to the difference indicating information.

5. The device of claim 1, wherein the control unit is configured to cause the display unit to display the difference indicating information when the first state information of the first ship has over a predetermined amount of difference from the second state information of the first ship.

6. The device of claim 1, wherein the difference indicating information includes a warning display.

7. The device of claim 1, wherein the display unit is configured to cause the display unit to display a graphical symbol indicating a length and width of the first ship obtained from the VDO information, in a scale corresponding to the situational image to serve as the first state information of the first ship.

8. The device of claim 1, wherein the VDO information includes at least one of a current position, a course over ground, a ground velocity, a heading, a rudder angular velocity, and a navigation state of the first ship.

9. A method of displaying ship perimeter information, comprising:
    receiving, via a sensor information input unit, sensor information that is a detection result of the sensor equipped in a first ship;
    receiving, via an Automatic Identification System (AIS) information input unit, VHF data link own-ship message (VDO) information contained in an AIS signal transmitted from a first ship to a second ship;
    with a control unit, causing a display unit to display information indicating a difference between first state information of the first ship obtained based on the detection result of the sensor and second state information of the first ship obtained based on the VDO information as a difference indicating information; and
    with the control unit, outputting a signal to automatically revise a setting of an AIS transceiver serving as an output source of the VDO information, when the first state information of the first ship has over a predetermined amount of difference from the second state information of the first ship.

10. The method of claim 9, wherein the difference indicating information includes a difference in position or heading of the first ship, and is displayed graphically.

11. The device of claim 9, wherein the difference indicating information includes a position and a heading of the first ship obtained from the VDO information.

12. The method of claim 9, wherein the inputting the VDO information includes receiving an input of VHF data link message (VDM) information of a second ship contained in an AIS signal transmitted from the second ship to the first ship, and
    displaying state information of the second ship obtained from the VDM information of the second ship in addition to the difference indicating information.

13. The method of claim 12, wherein the difference indicating information includes a warning display.

14. The method of claim 9, wherein the difference indicating information is displayed when the first state information of the first ship has over a predetermined amount of difference from the second state information of the first ship.

15. The method of claim 9, wherein the displaying the difference indicating information includes displaying a graphical symbol indicating a length and width of the first ship obtained from the VDO information, in a scale corresponding to the situational image to serve as the state information of the first ship.

* * * * *

UNITED STATES PATENT AND TRADEMARK OFFICE
CERTIFICATE OF CORRECTION

PATENT NO. : 9,453,912 B2
APPLICATION NO. : 13/864083
DATED : September 27, 2016
INVENTOR(S) : Hidetoshi Kaida et al.

Page 1 of 1

It is certified that error appears in the above-identified patent and that said Letters Patent is hereby corrected as shown below:

In the Claims

Column 12, Line 40, delete "inputting" and insert --receiving--; and

Column 12, Line 44, insert --, further comprising,-- after "and".

Signed and Sealed this
Thirty-first Day of January, 2017

Michelle K. Lee
*Director of the United States Patent and Trademark Office*